(12) United States Patent
Norris (10) Patent No.: US 8,903,104 B2
(45) Date of Patent: Dec. 2, 2014

(54) VIDEO GAMING SYSTEM WITH ULTRASONIC SPEAKERS

(71) Applicant: Parametric Sound Corporation, Poway, CA (US)

(72) Inventor: Elwood G. Norris, Poway, CA (US)

(73) Assignee: Turtle Beach Corporation, Poway, CA (US)

(*) Notice: Subject to any disclaimer, the term of this patent is extended or adjusted under 35 U.S.C. 154(b) by 84 days.

(21) Appl. No.: 13/863,971

(22) Filed: Apr. 16, 2013

(65) Prior Publication Data

US 2014/0307898 A1 Oct. 16, 2014

(51) Int. Cl.
*H04B 3/00* (2006.01)
*H04R 1/10* (2006.01)
*H04R 1/14* (2006.01)
*H04R 1/08* (2006.01)

(52) U.S. Cl.
CPC .............. *H04R 1/1016* (2013.01); *H04R 1/14* (2013.01); *H04R 1/08* (2013.01)
USPC ................ 381/77; 381/74; 381/309; 381/370

(58) Field of Classification Search
CPC .................................... H04B 3/00; H04R 1/10
USPC ......... 381/77, 74, 370–371, 381, 309; 463/35
See application file for complete search history.

(56) References Cited

U.S. PATENT DOCUMENTS

| 1,616,639 A | 2/1927 | Sprague |
| 1,764,008 A | 6/1930 | Crozier |
| 1,799,053 A | 3/1931 | Mache |

(Continued)

FOREIGN PATENT DOCUMENTS

| JP | H2265400 | 10/1990 |
| WO | WO01/08449 | 2/2001 |

(Continued)

OTHER PUBLICATIONS

Aoki et al; Parametric Loudspeaker—Characteristics of Acoustic Field and Suitable Modulation of Carrier Ultrasound, Electronics and Communications in Japan, Part 3, vol. 74, No. 9, 1991, pp. 76-82.

(Continued)

*Primary Examiner* — Disler Paul
(74) *Attorney, Agent, or Firm* — Thorpe North & Western LLP (57) ABSTRACT

A three-dimensional (3D) sound gaming application can include an ultrasonic sound system, one or more gamers, a gaming console and a throat microphone set. The ultrasonic sound system can include a digital signal processing (DSP) that can adjust the phase, delay, reverb, echo, gain, magnitude or other audio signal component of an audio signal or audio signal components received from the gaming console; an amplifier which can amplify the processed audio signal; and a pair of emitters which can emit ultrasonic signals to each of the gamer's ears to produce a 3D sound effect. The throat microphone set can include a throat microphone which can integrate a low pass filter to attenuate any picked up, ultrasonic carrier frequency signals from the emitted ultrasonic waves. In addition, the throat microphone set can also include an ear speaker piece with one or more apertures for allowing sound produced by ultrasonic waves to enter the gamer's ear canal.

24 Claims, 5 Drawing Sheets

(56) References Cited

U.S. PATENT DOCUMENTS

| | | | |
|---|---|---|---|
| 1,809,754 A | 6/1931 | Steedle |
| 1,951,669 A | 3/1934 | Ramsey |
| 1,983,377 A | 12/1934 | Kellogg |
| 2,461,344 A | 2/1949 | Olson |
| 2,855,467 A | 10/1958 | Curry |
| 2,872,532 A | 2/1959 | Buchmann et al. |
| 2,935,575 A | 5/1960 | Bobb |
| 2,975,243 A | 3/1961 | Katella |
| 2,975,307 A | 3/1961 | Schroeder et al. |
| 3,008,013 A | 11/1961 | Williamson et al. |
| 3,012,222 A | 12/1961 | Hagemann |
| 3,136,867 A | 6/1964 | Brettell |
| 3,345,469 A | 10/1967 | Rod |
| 3,373,251 A | 3/1968 | Seeler |
| 3,389,226 A | 6/1968 | Peabody |
| 3,398,810 A | 8/1968 | Clark, III |
| 3,461,421 A | 8/1969 | Stover |
| 3,544,733 A | 12/1970 | Reylek |
| 3,612,211 A | 10/1971 | Clark, III |
| 3,613,069 A | 10/1971 | Cary, Jr. |
| 3,654,403 A | 4/1972 | Bobb |
| 3,674,946 A | 7/1972 | Winey |
| 3,710,332 A | 1/1973 | Tischner et al. |
| 3,723,957 A | 3/1973 | Damon |
| 3,742,433 A | 6/1973 | Kay et al. |
| 3,787,642 A | 1/1974 | Young, Jr. |
| 3,816,774 A | 6/1974 | Ohnuki et al. |
| 3,821,490 A | 6/1974 | Bobb |
| 3,829,623 A | 8/1974 | Willis et al. |
| 3,833,771 A | 9/1974 | Collinson |
| 3,836,951 A | 9/1974 | Geren et al. |
| 3,892,927 A | 7/1975 | Lindenberg |
| 3,919,499 A | 11/1975 | Winey |
| 3,941,946 A | 3/1976 | Kawakami et al. |
| 3,997,739 A | 12/1976 | Kishikawa et al. |
| 4,056,742 A | 11/1977 | Tibbetts |
| 4,064,375 A | 12/1977 | Russell et al. |
| 4,160,882 A | 7/1979 | Driver |
| 4,207,571 A | 6/1980 | Passey |
| 4,210,786 A | 7/1980 | Winey |
| 4,242,541 A | 12/1980 | Ando |
| 4,245,136 A | 1/1981 | Krauel, Jr. |
| 4,284,921 A | 8/1981 | Lemonon et al. |
| 4,289,936 A | 9/1981 | Civitello |
| 4,295,214 A | 10/1981 | Thompson |
| 4,322,877 A | 4/1982 | Taylor |
| 4,378,596 A | 3/1983 | Clark |
| 4,385,210 A | 5/1983 | Marquiss |
| 4,418,404 A | 11/1983 | Gordon et al. |
| 4,419,545 A | 12/1983 | Kuindersma |
| 4,429,193 A | 1/1984 | Busch-Vishniac et al. |
| 4,439,642 A | 3/1984 | Reynard |
| 4,471,172 A | 9/1984 | Winey |
| 4,480,155 A | 10/1984 | Winey |
| 4,514,773 A | 4/1985 | Susz |
| 4,550,228 A | 10/1985 | Walker et al. |
| 4,558,184 A | 12/1985 | Busch-Vishniac et al. |
| 4,593,160 A | 6/1986 | Nakamura |
| 4,593,567 A | 6/1986 | Isselstein et al. |
| 4,672,591 A | 6/1987 | Breimesser et al. |
| 4,695,986 A | 9/1987 | Hossack |
| 4,751,419 A | 6/1988 | Takahata |
| 4,803,733 A | 2/1989 | Carver et al. |
| 4,823,908 A | 4/1989 | Tanaka et al. |
| 4,837,838 A | 6/1989 | Thigpen et al. |
| 4,872,148 A | 10/1989 | Kirby et al. |
| 4,885,781 A | 12/1989 | Seidel |
| 4,887,246 A | 12/1989 | Hossack et al. |
| 4,888,086 A | 12/1989 | Hossack et al. |
| 4,903,703 A | 2/1990 | Igarashi et al. |
| 4,908,805 A | 3/1990 | Sprenkels et al. |
| 4,939,784 A | 7/1990 | Bruney |
| 4,991,148 A | 2/1991 | Gilchrist |
| 5,018,203 A | 5/1991 | Sawyers et al. |
| 5,054,081 A | 10/1991 | West |
| 5,115,672 A | 5/1992 | McShane et al. |
| 5,142,511 A | 8/1992 | Kanai et al. |
| 5,153,859 A | 10/1992 | Chatigny et al. |
| 5,210,803 A * | 5/1993 | Martin et al. .................. 381/315 |
| 5,287,331 A | 2/1994 | Schindel et al. |
| 5,317,543 A | 5/1994 | Grosch |
| 5,357,578 A | 10/1994 | Taniishi |
| 5,361,681 A | 11/1994 | Hedstrom et al. |
| 5,392,358 A | 2/1995 | Driver |
| 5,430,805 A | 7/1995 | Stevenson et al. |
| 5,487,114 A | 1/1996 | Dinh |
| 5,539,705 A | 7/1996 | Akerman et al. |
| 5,638,456 A | 6/1997 | Conley et al. |
| 5,684,884 A | 11/1997 | Nakaya et al. |
| 5,700,359 A | 12/1997 | Bauer |
| 5,859,915 A | 1/1999 | Norris |
| 5,885,129 A | 3/1999 | Norris |
| 5,889,870 A | 3/1999 | Norris |
| 6,011,855 A | 1/2000 | Selfridge et al. |
| 6,041,129 A | 3/2000 | Adelman |
| 6,106,399 A | 8/2000 | Baker et al. |
| 6,108,427 A | 8/2000 | Norris et al. |
| 6,151,398 A | 11/2000 | Norris |
| 6,188,772 B1 | 2/2001 | Norris et al. |
| 6,229,899 B1 | 5/2001 | Norris et al. |
| 6,241,612 B1 | 6/2001 | Heredia |
| 6,304,662 B1 | 10/2001 | Norris et al. |
| 6,411,015 B1 | 6/2002 | Toda |
| 6,498,531 B1 | 12/2002 | Ulrick et al. |
| 6,556,687 B1 | 4/2003 | Manabe |
| 6,584,205 B1 | 6/2003 | Croft, III et al. |
| 6,606,389 B1 | 8/2003 | Selfridge et al. |
| 6,628,791 B1 | 9/2003 | Bank et al. |
| 6,631,196 B1 | 10/2003 | Higgings |
| 6,678,381 B1 * | 1/2004 | Manabe ........................ 381/77 |
| 6,775,388 B1 | 8/2004 | Pompei |
| 6,914,991 B1 | 7/2005 | Pompei |
| 6,975,731 B1 | 12/2005 | Cohen et al. |
| 7,162,042 B2 | 1/2007 | Spencer et al. |
| 7,369,665 B1 | 5/2008 | Cheng |
| 7,536,008 B2 * | 5/2009 | Howes et al. ............. 379/433.01 |
| 7,564,981 B2 | 7/2009 | Croft, III |
| 7,596,229 B2 | 9/2009 | Croft, III |
| 7,657,044 B2 | 2/2010 | Pompei |
| 7,667,444 B2 | 2/2010 | Mevay et al. |
| 7,729,498 B2 | 6/2010 | Spencer et al. |
| 7,850,526 B2 | 12/2010 | Mao |
| 7,957,163 B2 | 6/2011 | Hua |
| 8,027,488 B2 | 9/2011 | Pompei |
| 8,106,712 B2 | 1/2012 | Lee |
| 8,165,328 B2 | 4/2012 | Thomsen |
| 8,391,514 B2 | 3/2013 | Norris |
| 8,498,426 B2 * | 7/2013 | Bonanno ........................ 381/74 |
| 8,538,036 B2 * | 9/2013 | Pompei ........................ 381/85 |
| 2004/0052387 A1 | 3/2004 | Norris et al. |
| 2004/0264707 A1 * | 12/2004 | Yang et al. ..................... 381/77 |
| 2005/0008168 A1 | 1/2005 | Pompei |
| 2005/0008268 A1 | 1/2005 | Plourde et al. |
| 2005/0086058 A1 | 4/2005 | Lemelson et al. |
| 2005/0100181 A1 | 5/2005 | Croft, III et al. |
| 2005/0152561 A1 | 7/2005 | Spencer |
| 2005/0195985 A1 | 9/2005 | Croft, III et al. |
| 2005/0220311 A1 | 10/2005 | Sun et al. |
| 2006/0025214 A1 | 2/2006 | Smith |
| 2006/0215841 A1 | 9/2006 | Vieilledent et al. |
| 2007/0154035 A1 | 7/2007 | Fukui |
| 2007/0211574 A1 | 9/2007 | Croft |
| 2008/0261693 A1 | 10/2008 | Zalewski |
| 2010/0016727 A1 | 1/2010 | Rosenberg |
| 2010/0040249 A1 | 2/2010 | Lenhardt |
| 2010/0041447 A1 | 2/2010 | Graylin |
| 2010/0166222 A1 | 7/2010 | Bongiovi |
| 2010/0302015 A1 * | 12/2010 | Kipman et al. ............. 340/407.1 |
| 2011/0018710 A1 | 1/2011 | Booij et al. |
| 2011/0044467 A1 * | 2/2011 | Pompei ........................ 381/77 |
| 2011/0051977 A1 | 3/2011 | Losko et al. |
| 2011/0077080 A1 | 3/2011 | Meer |
| 2011/0103614 A1 | 5/2011 | Cheung et al. |
| 2011/0212777 A1 | 9/2011 | Chen |

(56) References Cited

U.S. PATENT DOCUMENTS

| | | |
|---|---|---|
| 2011/0216928 A1 | 9/2011 | Eisenberg et al. |
| 2012/0029912 A1* | 2/2012 | Almagro .................. 704/226 |
| 2012/0051556 A1 | 3/2012 | Pompei |
| 2012/0057734 A1 | 3/2012 | Schulein |
| 2012/0148070 A1 | 6/2012 | Norris |
| 2012/0148082 A1 | 6/2012 | Norris |
| 2014/0104988 A1 | 4/2014 | Norris |
| 2014/0133668 A1* | 5/2014 | Podoloff ..................... 381/74 |
| 2014/0161282 A1 | 6/2014 | Norris |
| 2014/0161291 A1* | 6/2014 | Matsuzawa ............... 381/191 |
| 2014/0205134 A1* | 7/2014 | Yagihashi et al. ......... 381/387 |

FOREIGN PATENT DOCUMENTS

| | | |
|---|---|---|
| WO | WO01/15491 | 3/2001 |
| WO | WO01/52437 | 7/2001 |
| WO | WO 2008/046175 A1 | 4/2008 |
| WO | WO 2013/158298 | 10/2013 |

OTHER PUBLICATIONS

Berktay et al; Possible Exploitation of Non-Linear Acoustics in Underwater Transmitting Applications, J. Sound Vib., Apr. 13, 1965, vol. 2, No. 4, pp. 435-461.

Crandall et al; The Air-Damped Vibrating System: Theoretical Calibration of the Condenser Transmitter; American Physical Society; Dec. 28, 1917; pp. 449-460.

Makarov et al; Parametric Acoustic Nondirectional Radiator; Acustica; 1992; vol. 77, pp. 240-242.

PCT Application PCT/US2013/021064; Filed Jan. 10, 2013; Parametric Sound Corporation; International Search Report Mailed May 16, 2013.

U.S. Appl. No. 13/738,887, filed Jan. 10, 2013; Elwood G. Norris.

U.S. Appl. No. 13/837,237, filed Mar. 15, 2013; Elwood G. Norris.

U.S. Appl. No. 13/935,246, filed Jul. 3, 2013; Elwood G. Norris.

U.S. Appl. No. 13/160,051, filed Jun. 14, 2011; Elwood G. Norris; Office Action issued Jul. 19, 2013.

Wagner; Electrostatic Loudspeaker Design and Construction; Audio Amateur Press Publishers; 1993; Chapters 4-5; pp. 59-91.

Westervelt; Parametric Acoustic Array; The Journal of the Acoustical Society of America; Apr. 1963; vol. 35, No. 1, pp. 535-537.

Yoneyama et al.; The Audio Spotlight: An Application of Nonlinear Interaction of Sound Waves to a New Type of Loudspeaker Design; Acoustical Society of America; 1983; vol. 73, No. 5; pp. 1532-1536.

U.S. Appl. No. 13/160,048, filed Jun. 14, 2011; Elwood G. Norris; office action dated Oct. 1, 2013.

U.S. Appl. No. 13/160,051, filed Jun. 14, 2011; Elwood G. Norris; office action dated Oct. 31, 2013.

U.S. Appl. No. 13/761,484, filed Feb. 7, 2013; Elwood G. Norris; office action dated Nov. 4, 2013.

U.S. Appl. No. 13/761,484, filed Feb. 7, 2013; Elwood G. Norris.

U.S. Appl. No. 13/801,718, filed Mar. 13, 2013; Elwood G. Norris.

U.S. Appl. No. 13/917,273, filed Jun. 13, 2013; Elwood G. Norris.

U.S. Appl. No. 13/917,315, filed Jun. 13, 2013; Elwood G. Norris.

PCT Application PCT/US2014/018691; filed Mar. 26, 2014; Parametric Sound Corporation; International Search report mailed Jun. 6, 2014.

* cited by examiner

VIDEO GAMING SYSTEM WITH ULTRASONIC SPEAKERS

BACKGROUND

1. Field of the Invention

The present disclosure relates generally to parametric loudspeakers for use in audio production, and more particularly, to video gaming systems that incorporate parametric loudspeakers.

2. Background Information

In a multi-player video game, two or more gamers or users can play at the same time and in the same virtual environment, even if the gamers are in different physical locations. Multi-player games allow gamers to interact with other individuals, be it in the form of partnership, competition or rivalry. Furthermore, it provides them with a form of social communication that is almost always missing in single-player oriented games. In a variety of different multiplayer game types, gamers compete against one or more human contestants, work cooperatively with other gamers in order to achieve a common goal, supervise activities of other players, or engage in a game type that incorporates any possible combination of the above.

The setup of multi-player video games may include standard Dolby 5.1 or 7.1 sound systems that can immerse gamers into a world with gaming action occurring around the gamer. These standard or conventional sound systems can typically include 5 or more speakers positioned around the gamer to produce a surround sound effect. For example, in a shooting game or other war simulation game, the gamer can be in a battlefield environment that includes aircraft flying overhead, vehicles approaching from or departing locations around the gamer, other characters sneaking up on the gamer from behind or from the side, gunfire at various locations around the gamer, and so on. As another example, consider a car racing game where the gamer is in the cockpit of the vehicle. He or she can hear engine noise from the front, exhaust noise from the rear, tires squealing from the front or rear, the sounds of other vehicles behind, and so on.

In addition to surround sound systems, multi-player video games often require the use of a throat microphone in order for gamers to communicate with other gamers located at different physical locations. While generally throat microphones can pick up gamer's voice within the surround sound environment, some models of throat microphones can be susceptible, or sensitive to high-frequency sound generated by emitters. This high-frequency signal can mask the voice picked up by the throat microphone, thereby adding distortion or noise to the gamer's communication channel. In addition, throat microphones can include an ear speaker piece that emits the voices or directions from other gamers according to gameplay action. Because this tiny ear speaker piece is often worn inside one of the gamer's ear canals, the surround sound effect produced by the emitters can be blocked or at least attenuated, thereby reducing or eliminating the overall surround sound experience.

SUMMARY

A three dimensional (3D) video game sound application can integrate the operation of an ultrasonic sound system with a throat microphone set, allowing suitable communication between one or more gamers without interrupting the 3D sound experience.

According to an embodiment, an ultrasonic sound system can include a digital signal processing (DSP) module which can receive an audio input signal from a gaming console such as PS3, Xbox, and Nintendo Wii U, among others. This DSP module can add phase, delay, reverb, echo, gain, magnitude or other effects to the audio signal or each of the audio signal components, followed by amplification and reproduction of the audio content using an amplifier and two ultrasonic emitters which can produce two separate and highly directional columns of ultrasonic waves aimed at each of the gamer's ears. The addition of phase, delay, gain, etc. to the audio signal or audio signal components on one of the two channels relative to the other channel can allow the audio reproduction of that audio signal or audio signal components to appear to be positioned in space relative to the gamer, thereby producing a 3D sound effect around the gamer.

A gamer using the ultrasonic sound system can also wear a throat microphone set or a boom microphone to communicate with other gamers during a multi-player game session. According to an embodiment, this throat microphone set can include a low pass filter circuit for attenuating the amplitude of any high frequency carrier signal picked up by the microphone. This low pass filter can be a single pole or multi-pole device established according to the impedance of the throat microphone and the gaming console, as well as the desired filtering characteristics. According to another embodiment, an active version of a low pass filter can be implemented with the addition of an operational amplifier or other solid-state circuit for increasing the voltage gain. In yet another embodiment, an active version of a low pass filter can be implemented using commercially available IC chips.

In a further embodiment, a throat microphone operating in conjunction with the ultrasonic sound system can include an ear speaker piece with one or more apertures for preventing the blocking of audio into the gamer's ear canal. These apertures can be formed in the rubber or plastic pad, housing, or frame of the ear speaker piece and around the speaker that emits the voice of other gamer(s) into the ear canal. The output of the ultrasonic emitters can be balanced, right or left, to compensate for any sound amplitude attenuation that can still be present at the gamer's ear wearing the ear speaker piece with apertures.

The disclosed ultrasonic sound system can produce highly directional beams of ultrasonic waves that can reproduce audio in the environment around a gamer, thereby producing a suitable 3D sound gaming experience. In addition, embodiments herein described allow the integration of a throat microphone set into the 3D sound gaming experience by just adding a simple and low cost, low pass RC filter, as well as one or more apertures in the ear speaker piece, where said apertures can also be easy to implement. Additional features and advantages can become apparent from the detailed descriptions which follow, taken in conjunction with the accompanying drawings.

BRIEF DESCRIPTION OF THE FIGURES

Non-limiting embodiments of the present invention are described by way of example with reference to the accompanying figures which are schematic and are not intended to be drawn to scale. Unless indicated as representing the background information, the figures represent aspects of the invention.

DETAILED DESCRIPTION

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

DEFINITION OF TERMS

As used herein, "emitter" can refer to a device capable of emitting ultrasonic signals.

As used herein, "throat microphone" can refer to a device capable of picking up a gamer's speech during a 3D sound gaming session.

As used herein, "ultrasonic sound system" can refer to a system that can include a digital signal processing (DSP), an amplifier, and a pair of emitters capable of generating and emitting ultrasonic signals for the production of a 3D sound effect around a gamer.

As used herein, "gamer" can refer to a person that plays multi-player video games using a throat microphone and an ultrasonic sound system or a conventional sound system.

As used herein, "apertures" can refer to one or more vents, channels or openings that can be formed in or through the rubber or plastic pad, housing, or frame of an ear speaker piece to allow ultrasonic signals to enter the gamer's ear canal.

DESCRIPTION OF EMBODIMENTS OF THE INVENTION

Figure 1:
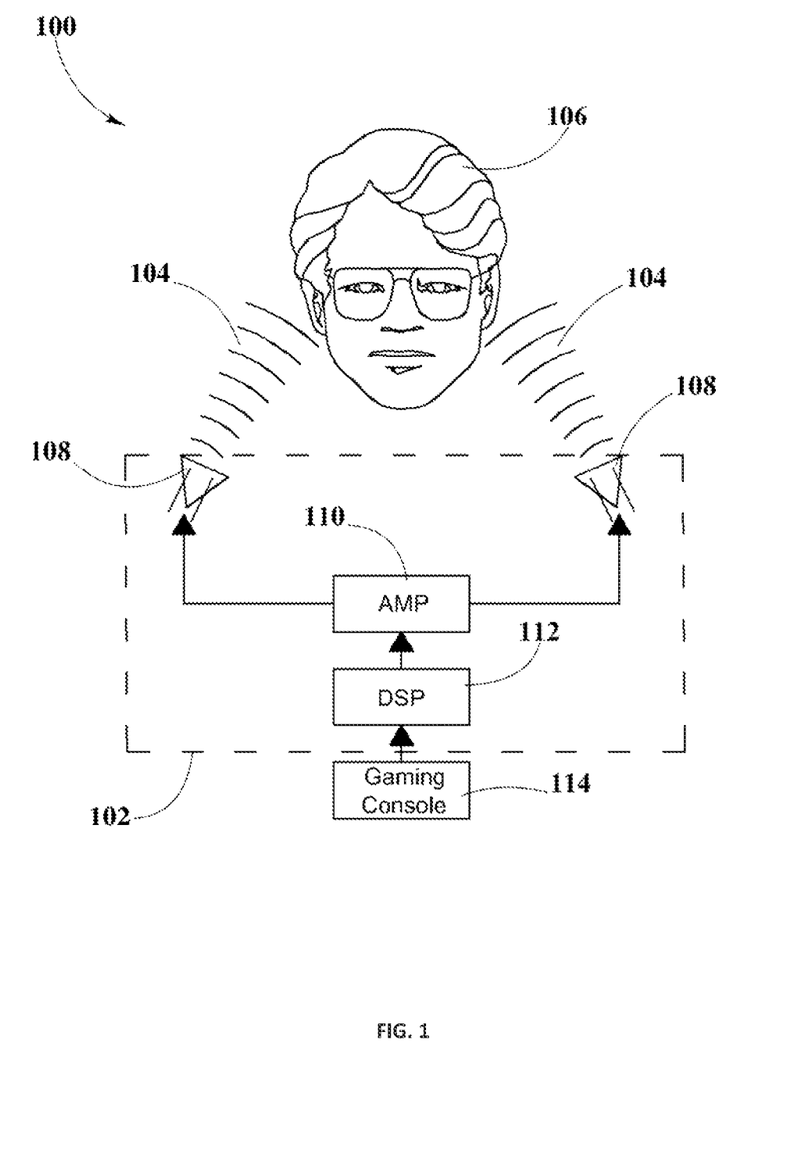
FIG. 1 depicts a simplified block diagram of a 3D sound gaming application using a pair of ultrasonic emitters.

FIG. 1 illustrates a simplified block diagram of a 3D sound gaming application 100, where an ultrasonic sound system 102 can produce and direct ultrasonic waves 104 to one or more gamers 106 in order to create a 3D sound effect, according to an embodiment. This ultrasonic sound system 102 can include two or more ultrasonic emitters 108, an amplifier 110, and a digital signal processing (DSP) module 112.

A gaming console 114 can generate an audio signal which can be received by DSP module 112 in the ultrasonic sound system 102. Gaming console 114 can include computer hardware platforms such as PS3, Xbox, Nintendo Wii, Nintendo Wii U, and PCs among others. DSP module 112 can process various components of the audio signal from gaming console 114. Specifically, DSP module 112 can adjust the phase, delay, reverb, echo, gain, magnitude or other audio signal component of the audio signal or audio signal components on one of the two channels relative to the other channel, allowing the audio reproduction of that audio signal or audio signal components to appear to be positioned in space relative to gamer 106. For example, computer-generated audio components can be created with or modified to have signal characteristics to allow placement of various components and their desired respective positions in the listening environment around gamer 106.

The processed audio signal can be combined with a carrier signal generated by an oscillator integrated in DSP module 112. Amplifier 110 can then be used to amplify the modulated and processed audio signal, resulting in an amplified ultrasonic signal with a carrier frequency.

The modulated ultrasonic signal is then provided to ultrasonic emitters 108, which can emit and direct ultrasonic waves 104 into each of the gainer's 106 ears. In some embodiments, ultrasonic wave 104 can be a parametric ultrasonic wave. As shown in FIG. 1, these ultrasonic emitters 108 can be aimed at gamer's 106 ears. When played back through ultrasonic emitters 108 at a sufficiently high sound pressure level, due to the nonlinear behavior of the air through which it is "played" or transmitted, the carrier signal in the ultrasonic waves 104 can mix with the sideband (s) to demodulate the signal and reproduce the audio content.

By adding phase, delay, reverb, echo, gain, magnitude or effects to each of the audio signal components in DSP module 112, and then playing the audio content to gamer 106 using parametric sound through directional ultrasonic emitters 108, the gamer 106 can be immersed in a 3D audio experience using only two ultrasonic emitters 108. For example, increasing the gain of an audio component, such as a gun fire derived from a game being played in gaming console 114, on the left channel relative to the right, and at the same time adding phase changes or delay (or echo, reverb, etc.) on that audio component for the right channel relative to the left, can make that audio component to the positioned to the left of gamer 106.

In addition, different levels of this audio processing can be applied to different audio components to place each audio component properly around gamer 106. For example, when a game character in the game is approaching the user, each footstep of that character can be encoded differently to reflect that footstep's position relative to the prior or subsequent footsteps of that character. Thus applying different processing to each subsequent footstep audio component, the footsteps can be made to sound like they are moving toward the gamer 106 from a predetermined location or moving away from the gamer 106 to a predetermined position. Additionally, the volume of the footstep sound components can be likewise adjusted to reflect the relative distance of the footsteps as they approach or move away from the gamer.

Figure 2:
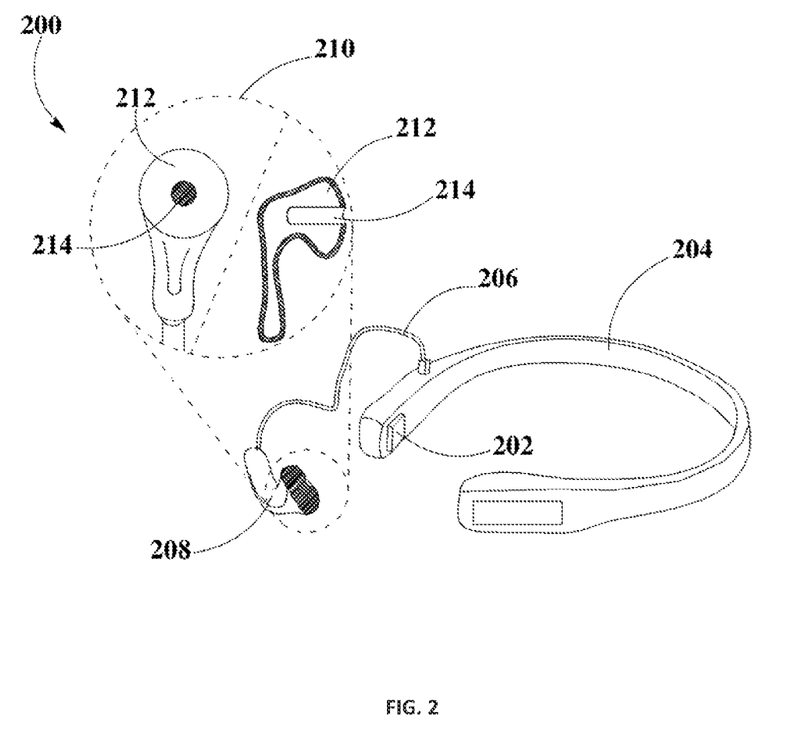
FIG. 2 illustrates a throat microphone set that can be used by a gamer during a standard sound gaming application.

Referring now to FIG. 2, a throat microphone set 200 can be used by a gamer 106 (FIG. 1) during a conventional sound gaming application to communicate with other gamer(s) at different locations. This throat microphone set 200 can include a throat microphone 202, a flexible frame 204, a connection cord 206, and an ear speaker piece 208. Throat microphone 202 can pick up voice signals via vibrations generated by gamers 106 through a transducer or sensor positioned on of the gamer's throat. The transducer integrated in throat microphone 202 can pick up speech even in loud environments, whereas other types of microphones do not function well under those conditions because of high levels of background sounds.

Flexible frame 204 can be used to hold the throat microphone set 200 around gamer's 106 neck, and can be adjustable according to gamer's 106 neck size. Note that, while connection cord 206 is shown connecting ear speaker piece to the frame, the ear speaker can be wirelessly integrated within the system.

In FIG. 2, zoom-in view 210 shows front and side views of ear speaker piece 208 which can include a plastic or rubber pad, housing, or frame 212 to secure the ear speaker piece 208 into one of gamer's 106 ear canals. Pad, housing, or frame 212 can include other suitable materials such as silicone or foam, among others, and may be configured in a variety of shapes and dimensions. Ear speaker piece 208 can include a small speaker 214 which can reproduce voice sounds coming from one or more gamers at another physical location. That is, in spite of the sound coming out of a standard sound system, speaker 214 in ear speaker piece 208 can establish a private communication channel where a gamer 106 can listen to others gamers at different physical locations.

Although throat microphone set 200 is shown in FIG. 2 with respective shape and components, other geometric shapes and components can be contemplated. That is, features of throat microphone set 200 can vary depending on the manufacturer model. Commercially available manufacturers of throat microphone set 200 can include Gioteck, CTA digital, Mad Catz, and AGPtek, among others.

Figure 3:
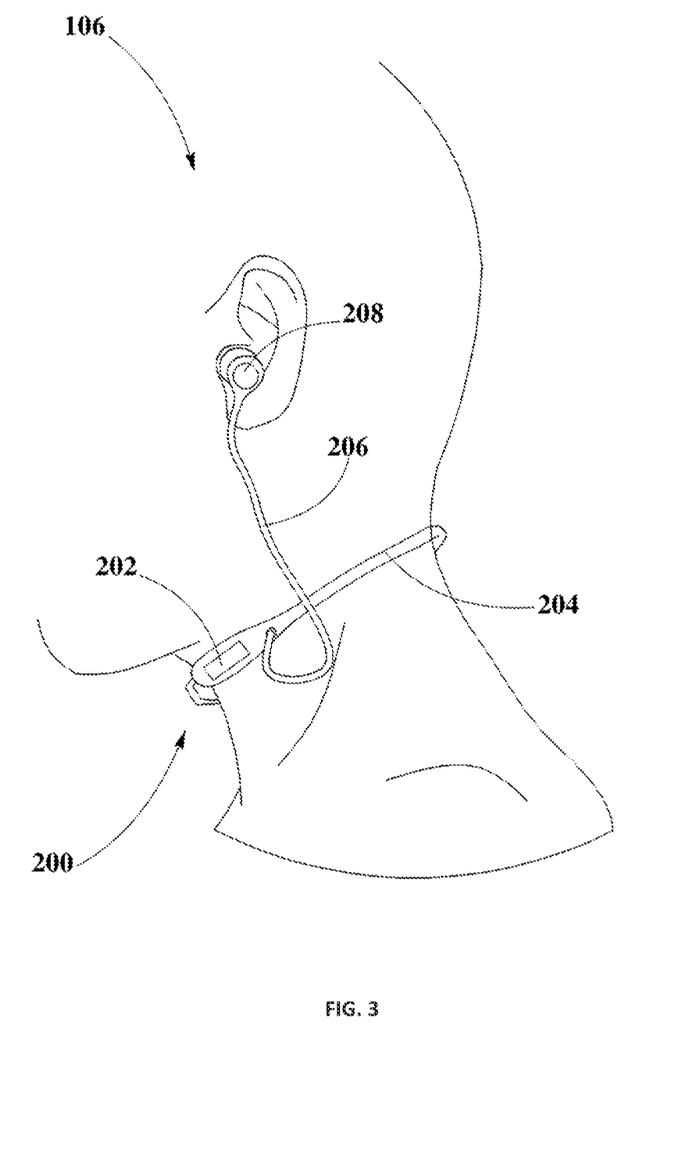
FIG. 3 shows a gamer wearing the throat microphone set during a standard sound gaming.

FIG. 3 shows a gamer 106 that is wearing the throat microphone set 200 during a conventional gaming application. When using standard or conventional surround sound systems such as Dolby 5.1 or 7.1, gamer 106 can also wear throat microphone set 200 without affecting communication with other gamers or without blocking the surround sound effect. However, wearing throat microphone set 200 as shown in FIG. 3 can have a negative impact during the production of a 3D sound gaming application 100.

As explained in FIG. 1, a gamer 106 can be positioned in front of ultrasonic emitters 108 in order to experience a 3D sound game experience. Simultaneously to receiving the audible sound created by the ultrasonic waves 104 at each ear, gamer 106 can talk and listen to other gamer (s) at different locations using throat microphone 202 and ear speaker piece 208. Given the intensity level of the ultrasonic waves 104, some models of throat microphone 202 can pick up this carrier signal, thus masking the voice of gamer 106. Voice masking can be produced by the higher frequency range exhibited by the carrier signal in comparison with gamer's 106 voice frequency range. That is, carrier signal in ultrasonic waves 104 can exhibit a high frequency range from about 40 kHz to about 60 kHz, while typical frequency ranges of gamer's 106 voice can be significantly lower, typically in the range between about 100 Hz and 4 kHz. This voice masking can negatively impact the communication of gamer 106 with other gamer (s) when playing a multi-player game.

Another problem or limitation can arise when wearing the throat microphone set 200 as shown in FIG. 3. As explained in FIG. 1, ultrasonic emitters 108 are required to emit two separate columns of ultrasonic waves 104 to reproduce sound into each of gamer's 106 ears and generate a 3D sound effect. When gamer 106 is wearing throat microphone set 200, pad, housing, or frame 212 which may be comprised of plastic or rubber in ear speaker piece 208 can partially or completely block one of the ear canals of gamer 106, thereby eliminating or at least attenuating the 3D sound experience produced by ultrasonic sound system 102.

The following embodiments herein described aim at solving the problems of carrier frequency pick up and sound obstruction in order to provide a suitable 3D sound gaming application 100 capable of incorporating a throat microphone set 200 for communication between two or more gamers 106.

Figure 4:
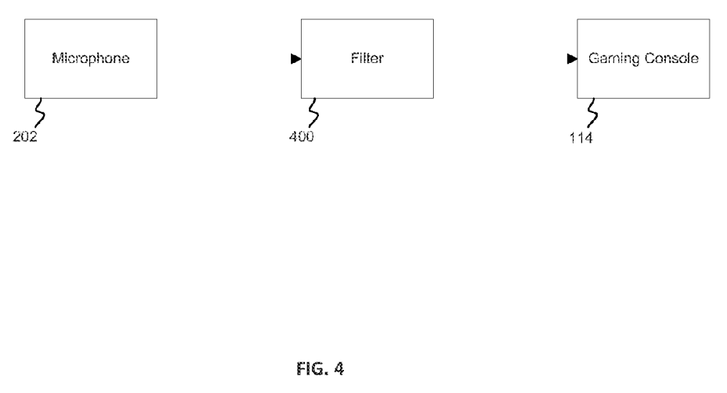
FIG. 4 illustrates a simplified flowchart illustrating the use of a filter circuit that can filter or attenuate any high frequency signals that might be picked up by the microphone during a 3D sound gaming application.

Referring now to FIG. 4, a conventional low pass filter circuit 400 can be integrated into throat microphone 202 to filter or attenuate high frequency carrier signals that might be picked up during 3D sound gaming application 114, according to an embodiment. This low pass filter circuit 400 can be included in models throat microphone sets 200 susceptible or sensitive to the frequency carrier signals in ultrasonic waves 104.

The Low pass filter circuit 400 can include a resistor configured in series with a capacitor (neither shown in detail). The input of this low pass filter circuit 400 can be the voice of gamer 106 along with any high frequency carrier signal picked up by throat microphone 202. The output of low pass filter circuit 400 can be a filtered or attenuated high frequency carrier signal along with the voice of gamer 106 operatively coupled to a corresponding gaming console 114.

The filter circuit can include a variety of components (most not shown in detail). For example, the resistor can exhibit resistance values of about 4.7 kΩ, while capacitance values of the capacitor can range from about 0.22 mF to about 10 nF, where these resistance and capacitance values can vary depending on the impedances of throat microphone 202 and gaming console 114, as well as the desired filter characteristics. In one embodiment, values for the resistor and the capacitor can be set to sufficiently eliminate or attenuate any ultrasonic frequency signals that may reach the throat microphone 202. The low pass filter circuit can provide a rate of frequency roll-off of about 6 dB per octave.

In another embodiment, an active version of low pass RC filter circuit 400 can include an operational amplifier circuit or any other solid-state circuit added to the output or capacitor to increase the voltage gain above 1, if necessary. Yet in another embodiment, an active version of low pass filter circuit can be implemented using commercially available integrated circuit (IC) chips with different configurations and features, where in such case, this active version of low pass RC filter circuit 400 can be isolated from the impedances of throat microphone 202 and gaming console 114.

Figures 5A, 5B:
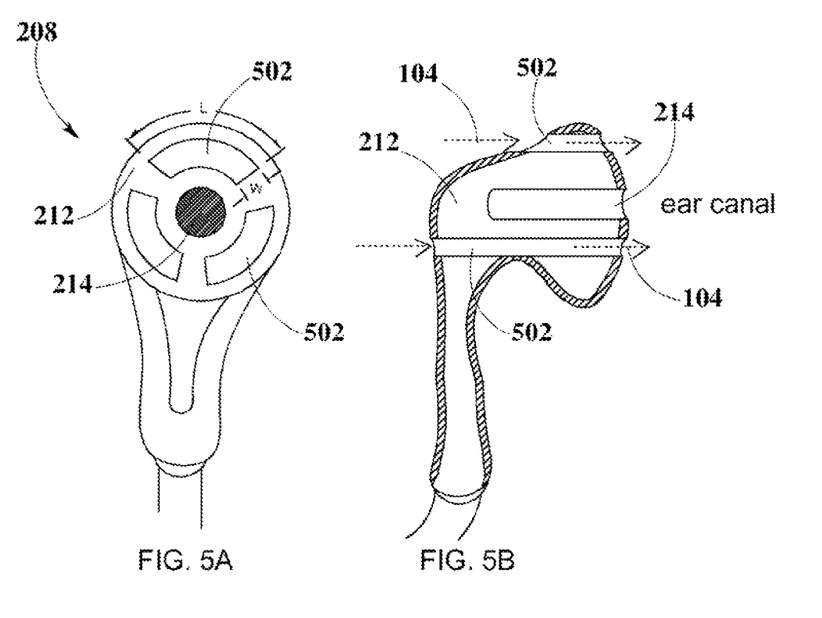
FIG. 5A depicts a front view of an ear speaker piece that can include one or more apertures in the rounded plastic or rubber support pad to prevent blocking sound waves from entering the gamer's ear canal.
FIG. 5B depicts a sectional view of the ear speaker piece of FIG. 5A.

FIG. 5 shows an example of an ear speaker piece 208 which can include one or more apertures 502 formed in or through the rounded plastic or rubber pad, housing, or frame 212 to prevent the ear speaker from blocking the ultrasonic waves 104 from entering the gamer's 106 ear canal, according to an embodiment. Apertures 502 in pad, housing, or frame 212 can allow sound produced by ultrasonic waves 104 to sufficiently enter the corresponding gamer's 106 ear canal, facilitating the establishment of a suitable 3-D sound gaming application 100.

FIG. 5 A illustrates a front view of ear speaker piece 208, where apertures 502 can be formed in the rounded plastic or rubber pad, housing, or frame 212 around speaker 214. These apertures 502 can exhibit suitable dimensions, length L and width W, for allowing sound from ultrasonic waves 104 to enter gamer's 106 ear canal and produce a 3D sound effect. Although ear speaker piece 208 and apertures 502 are shown in respective shapes and geometric relationships, other geometric relationships and shapes may be contemplated. For example, apertures 502 can exhibit a circular shape (not shown in FIG. 5), while ear speaker piece 208 can exhibit a variety of configurations depending on the model of throat microphone set 200.

Compared to an open ear canal, the use of ear speaker piece 208 with apertures 502 may slightly decrease the amplitude of ultrasonic waves 104, specifically in the range of about 2 dB to 3 dB. In such case, output levels in ultrasonic emitters 108 can be balanced to compensate for the amplitude loss in the gamer's 106 ear that is using the ear speaker piece 208. For the example, as shown in FIG. 1 and FIG. 3, if gamer 106 is wearing the ear speaker piece 208 in his/her left ear, then output level of ultrasonic emitter 108 aimed to the left of gamer 106 can be increased to compensate for the sound amplitude loss at his/her left ear. Similarly, if gamer 106 is wearing the ear speaker piece 208 in his/her right ear, then output level of ultrasonic emitter 108 aimed to the right of gamer 106 can be increased to compensate for the sound amplitude loss at his/her right ear. In addition, this ear speaker piece 208 with apertures 502 does not have any effect in the range of audible frequencies of gamer 106, in other words, gamer 106 should be able to listen to all frequency levels according to his/her natural hearing capabilities.

Sectional view of ear speaker piece 208 in FIG. 5B shows how apertures 502 can be formed through the rubber or plastic pad, housing, or frame 212 to create one or more channels, openings, conduits, etc. that can allow audible sound created by ultrasonic devices 108 to enter gamer's 106 ear canal; thereby producing a suitable 3D sound gaming application 100 capable of integrating a throat microphone set 200 for communication between one or more gamers 106.

The present 3D sound system has proven superior to conventional surround sound systems in numerous ways. While conventional surround sound systems may provide a number of speakers surrounding a listener, each of these speakers is still limited to producing conventional audio. This conventional audio produced by each speaker is still "flat." In contrast, the audio produced by the present emitters is capable of generating directional sound—the listener can detect variances in distance of sounds heard, relative to the listener, even if such sound is produced by only one, or most advantageously two emitters. The unique design of the ear speaker pieces of the present invention allow the use of both ultrasonic emitters and a regular earpiece speaker: without allowing the ultrasonic waves to pass through the openings in the earpiece speaker, the gamer's experience of 3D sound might otherwise be greatly diminished.

While various aspects and embodiments have been disclosed herein, other aspects and embodiments can be contemplated. The various aspects and embodiments disclosed herein are for purposes of illustration and are not intended to be limiting, with the true scope and spirit being indicated by the following claims.

I claim:

1. A method of providing a three-dimensional gaming experience to a user, comprising:
   providing a gaming system having a digital signal processor ("DSP"), an amplifier, and a plurality of ultrasonic emitters, wherein each of a user's ears receives a directional ultrasonic wave column from at least one independent ultrasonic emitter;
   providing an interface to interact with at least one other game user, the interface including an ear speaker piece placed in or around the user's ear and at least one microphone;
   configuring the microphone to receive voice input from the user; and
   configuring the ear speaker piece to relay voice input from the at least one other game user into the user's ear; and
   adjusting the amplitude of the directional ultrasonic wave column directed toward the user's ear having the ear speaker piece to compensate for any sound loss due to the presence of the ear speaker piece.

2. The method of claim 1, further comprising:
   providing a plurality of holes through a frame of the ear speaker piece and configuring the holes to allow ultrasonic waves generated by the ultrasonic emitters to pass through the ear speaker piece.

3. The method of claim 1, wherein the microphone includes a throat microphone.

4. The method of claim 3, further comprising:
   providing a flexible frame; and
   configuring the flexible frame to position the throat microphone against the user's throat.

5. The method of claim 1, further comprising:
   providing a low pass filter integrated into the microphone, the low pass filter configured to optimize the voice input by the user and to filter unwanted high frequency signals which may inhibit clear voice transmission to other users.

6. The method of claim 1, further comprising independently adjusting the phase, delay, reverb, echo, gain or magnitude of each of the ultrasonic emitters to reflect the relative virtual location of a sound's origin in relation to a character within a game controlled by the user.

7. A method of providing a user with a three-dimensional gaming experience comprising:
   providing a plurality of ultrasonic emitters operably connected to a sound output of a gaming system;
   independently directing each ultrasonic emitter toward one of a user's ears, the ultrasonic emitters being operable to direct a plurality of directional sound columns to the user's ears based on a virtual sound direction relating to a virtual origin from which a plurality of virtual sounds are generated; and
   relaying to the ultrasonic emitters a signal relating to a plurality of virtual sounds such that the ultrasonic emitters project sound toward a user's ears so as to reproduce the virtual sounds to create a realistic three-dimensional sound environment;
   providing a multi-player communication interface including a user microphone and an ear speaker piece placed in or about the user's ear, wherein the microphone is configured to relay a voice input from the user to at least one other user; and
   configuring the ear speaker piece to relay sound to the user relating to voice input from the at least one other user; wherein
   a frame of the ear speaker piece includes a plurality of openings formed therein or therethrough, the openings being operable to allow directional sound to pass through the ear speaker piece into the user's ear.

8. The method of claim 7, further comprising:
   adjusting the phase, delay, reverb, echo, gain or magnitude of the modulated ultrasonic wave column directed toward the user's ear having the ear speaker piece fitted therein to compensate for sound loss due to the presence of the ear speaker piece in or about the user's ear.

9. The method of claim 7, further comprising:
   a low pass filter integrated into the microphone wiring configured to filter high frequency interference signals.

10. The method of claim 7, wherein the microphone includes a throat microphone.

11. The method of claim 10, further comprising:
    providing a flexible frame; and
    configuring the flexible frame to position the throat microphone against the user's throat.

12. A method of providing a three-dimensional gaming experience to a user, comprising:
    providing a gaming system having a digital signal processor ("DSP"), an amplifier, and a plurality of ultrasonic emitters, wherein each of a user's ears receives a directional ultrasonic wave column from at least one independent ultrasonic emitter;

providing an interface to interact with at least one other game user, the interface including an ear speaker piece placed in or around the user's ear and at least one microphone;

configuring the microphone to receive voice input from the user;

configuring the ear speaker piece to relay voice input from the at least one other game user into the user's ear; and providing a plurality of holes through a frame of the ear speaker piece and configuring the holes to allow ultrasonic waves generated by the ultrasonic emitters to pass through the ear speaker piece.

13. The method of claim 12, further comprising:
adjusting the amplitude of the directional ultrasonic wave column directed toward the user's ear having the ear speaker piece to compensate for any sound loss due to the presence of the ear speaker piece.

14. The method of claim 12, wherein the microphone includes a throat microphone.

15. The method of claim 14, further comprising:
providing a flexible frame; and
configuring the flexible frame to position the throat microphone against the user's throat.

16. The method of claim 12, further comprising:
providing a low pass filter integrated into the microphone, the low pass filter configured to optimize the voice input by the user and to filter unwanted high frequency signals which may inhibit clear voice transmission to other users.

17. The method of claim 12, further comprising independently adjusting the phase, delay, reverb, echo, gain or magnitude of each of the ultrasonic emitters to reflect the relative virtual location of a sound's origin in relation to a character within a game controlled by the user.

18. A method of providing a user with a three-dimensional gaming experience comprising:
providing a plurality of ultrasonic emitters operably connected to a sound output of a gaming system;
independently directing each ultrasonic emitter toward one of a user's ears, the ultrasonic emitters being operable to direct a plurality of directional sound columns to the user's ears based on a virtual sound direction relating to a virtual origin from which a plurality of virtual sounds are generated;
relaying to the ultrasonic emitters a signal relating to a plurality of virtual sounds such that the ultrasonic emitters project sound toward a user's ears so as to reproduce the virtual sounds to create a realistic three-dimensional sound environment;
providing a multi-player communication interface including a user microphone and an ear speaker piece placed in or about the user's ear, wherein the microphone is configured to relay a voice input from the user to at least one other user;
configuring the ear speaker piece to relay sound to the user relating to voice input from the at least one other user; and
adjusting the phase, delay, reverb, echo, gain or magnitude of the modulated ultrasonic wave column directed toward the user's ear having the ear speaker piece fitted therein to compensate for sound loss due to the presence of the ear speaker piece in or about the user's ear.

19. The method of claim 18, wherein a frame of the ear speaker piece includes a plurality of openings formed therein or therethrough, the openings being operable to allow directional sound to pass through the ear speaker piece into the user's ear.

20. The method of claim 18, further comprising:
a low pass filter integrated into the microphone wiring configured to filter high frequency interference signals.

21. The method of claim 18, wherein the microphone includes a throat microphone.

22. The method of claim 21, further comprising:
providing a flexible frame; and
configuring the flexible frame to position the throat microphone against the user's throat.

23. The method of claim 18, further comprising:
providing a low pass filter integrated into the microphone, the low pass filter configured to optimize the voice input by the user and to filter unwanted high frequency signals which may inhibit clear voice transmission to other users.

24. The method of claim 18, further comprising independently adjusting the phase, delay, reverb, echo, gain or magnitude of each of the ultrasonic emitters to reflect the relative virtual location a sound's origin in relation to a character within a game controlled by the user.

* * * * *